United States Patent [19]

Sun

[11] Patent Number: 5,208,094

[45] Date of Patent: * May 4, 1993

[54] MULTILAYERED FILM FOR PACKAGING

[76] Inventor: Joseph Z. Sun, 14 Cheng Kong Road, Feng Shan, Taiwan

[ * ] Notice: The portion of the term of this patent subsequent to Mar. 4, 2009 has been disclaimed.

[21] Appl. No.: 28,884

[22] Filed: Mar. 23, 1987

Related U.S. Application Data

[63] Continuation of Ser. No. 730,865, May 6, 1985, abandoned.

[51] Int. Cl.$^5$ .............................................. B32B 9/00
[52] U.S. Cl. .................... 428/212; 428/476.1; 428/500; 428/516; 428/511; 428/520; 428/522
[58] Field of Search ...................... 428/35, 500, 476.1, 428/516, 518, 520, 522, 212, 36

[56] References Cited

U.S. PATENT DOCUMENTS

| | | | |
|---|---|---|---|
| 4,178,401 | 12/1979 | Weinberg et al. | 428/35 |
| 4,247,584 | 1/1981 | Widiger et al. | 428/35 |
| 4,254,169 | 3/1981 | Schroeder | 428/35 |
| 4,617,241 | 10/1986 | Mueller | 428/520 |

FOREIGN PATENT DOCUMENTS 103559  3/1981  Japan ..................... 428/35

Primary Examiner—Patrick J. Ryan

[57] ABSTRACT

A film for packaging foodstuffs utilizing a first outer layer of a cross-linked olefin polymer and a second inner layer adapted for lying adjacent foodstuff being packaged. The second inner layer is constructed of a material having a self sealing capability and which produces a moisture barrier without preventing the passage of free oxygen through the second layer.

11 Claims, 1 Drawing Sheet

MULTILAYERED FILM FOR PACKAGING

This a continuation application in part of Ser. No. 06/730,865 filed May 6, 1985 now abandoned.

BACKGROUND OF THE INVENTION

The present invention relates to a novel film for packaging foodstuffs especially frozen meats and retortable pouches.

Prior packages for foodstuffs have used a laminate of cross-linked EVA layer with a protective outer layer. Such packaging films although useful in certain situations do not possess abuse resistance due to shipping and are not self-weldable after cross-linking and are not resistant to fat attack. In addition, the prior films are very expensive and difficult to produce since a coating or cladding process must be used instead of a coextrusion for producing films results in a great savings in manpower in energy over the prior coating or cladding process.

A film which possesses the ability to be coextruded, has the ability to self-weld, resists fat attack and presents a water barrier without a coexisting oxygen barrier would be most useful in packaging frozen foods and retortable items.

SUMMARY OF THE INVENTION

In accordance with the present invention a film for packaging foodstuffs having a water barrier without a coexisting oxygen barrier and which is capable of being produced by a coextrusion process provided.

The film of the present invention utilizes a first outer layer of a cross-linked olefin polymer. The olefin polymer may include an ethylene-vinyl acetate co-polymer (EVA), polyethylene, polyester, nylon, and the like. The first outer layer is intended to be one which possesses abrasion resistance.

Joined to the first outer layer is a second inner layer which is also adapted for lying adjacent to foodstuff. The second inner layer is constructed of a material having self-sealing capabilities, producing a moisture ($H_2O$), and permitting the passage of free oxygen through the same. Second inner layer may also be constructed of ethylene-vinyl acetate co-polymer which would be useable with fresh produce and frozen vegetables. The second inner layer may also consist of polypropylene polymer and/or polypropylene-ethylene co-polymer mixed with an elastomer. In the latter case, the film would be useable with meats and be manufactured into retortable pouches, since polypropylene is resistant to fat and can resist higher cooking temperatures. Again, the second layer would present a moisture barrier but permit the passage of free oxygen.

In general, the first layer would possess a thickness greater than the second inner layer to aid in its abuse resistance. Cross-linking of the outer layer may occur by radiation. The dosage of radiation would be adjusted such that the inner layer would not be affected by the same, thus no cross-linking of the second inner layer would occur.

The second inner layer may be split into a first ply which would lie adjacent the first outer layer and a second ply, which would be intended for contacting foodstuff. The first outer layer may comprise a vinyl acetate co-polymer which has a lower percentage of vinyl acetate than the ethylene-vinyl acetate co-polymer of the first ply of the second inner layer. The second ply of the second inner layer may comprise a material having a self-sealing capability, producing a moisture barrier, and permitting the passage of free oxygen therethrough. The second ply of the second inner layer may include an ethylene-vinyl acetate co-polymer or a polypropylene polymer mixed with an elasteomer such as polyisobutylene.

It may be apparent that a novel and useful film for the packaging of foodstuffs has been described.

It is therefore an object of the present invention to provide a film for packaging foodstuffs which may be produced by a coextrusion process.

It is another object of the present invention to provide a film for packaging foodstuffs which provides a moisture barrier without an oxygen barrier.

It is yet another object of the present invention to provide a film for packaging foodstuffs which is resistant to fat containing foodstuffs and may be heated to boiling point temperatures.

Another object of the present invention is to provide a film for packaging foodstuffs which offers abuse resistance and may easily be cross-linked in one layer without cross-linking another layer of film.

Yet another object of the present invention is to provide a film for packaging foodstuffs which uses relatively inexpensive components, is self-weldable, and relatively easy to manufacture. The invention possesses other objects and advantages especially as concerns particular characteristics and features thereof which will become apparent as the description continues.

For a better understanding of the invention reference is made to the following detailed description which should be reference to the herein above described drawings.

DESCRIPTION OF THE PREFERRED EMBODIMENTS

Various aspects of the present invention will evolve from the following detailed description of the preferred embodiments thereof which should be taken in conjunction with the hereinabove described drawings.

The term "Saran" is used in this description in its commercial meaning i.e. co-polymers of vinylidene chloride and vinyl chloride. Other chemical additives such as stablizers, pigmenting agents, antiblocking additives, and the like are not deemed to substantially reduce the actual weight content of the recited materials.

Figure 1:
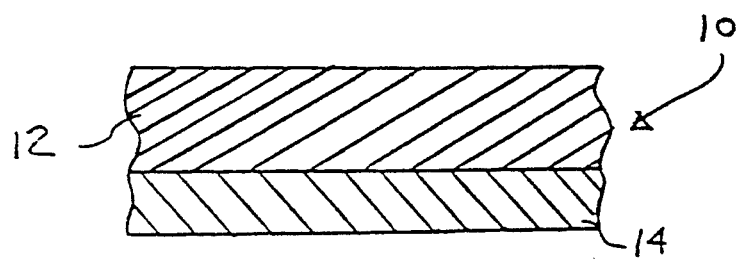
FIG. 1 is a cross sectional view of the coextruded film of the present invention.

The invention as a whole is represented in the drawings by reference character 10 which depicts a laminate film which is especially useful for the storage of foodstuffs. FIG. 1 includes a first outer layer 12 and a second inner layer 14 which is laminated or welded to the first outer layer 12. First outer layer 12 may be composed of an olefin polymer which is preferably cross-linked by radiation or other means to toughen the same against abrasion. For example, ethylene vinyl acetate co-polymer, polyethylene, polyester, Nylon, and like may be employed for this purpose. The cross-linking of first outer layer 12 may be accomplished after extrusion of film 10 and cooling of the same. Outer layer 12 may have a vinyl acetate percentage of 3.5 to 15 percent of the ethylene vinyl acetate co-polymer.

Second inner layer 14 may be composed of ethylene vinyl acetate having a vinyl acetate content of 4 to 22 percent therein. The use of EVA provides a moisture barrier to the foodstuffs lying adjacent second inner layer 14 without preventing passage of oxygen through film 10. This characteristic is especially useful for packaging products that do not require an oxygen barrier such as produce, frozen foods, and retortable materials. Second inner layer 14 is self-weldable through the use of high vinyl acetate content EVA material. Second inner layer 14 may also be composed of polypropylene which is more resistant to deterioration caused by fats of the foodstuffs contacting second inner layer 14, then EVA. Second inner layer 14 utilizing polypropylene may be given more elasticity by the addition of an elastomeric material such as polyisobutylene.

In general, first outer layer 12 would possess a thickness greater than second inner layer 14 as will be described in the examples which follow. In general, first outer layer would possess a thickness compatable with the intended abuse during packaging and shipping of the foodstuffs.

Figure 2:
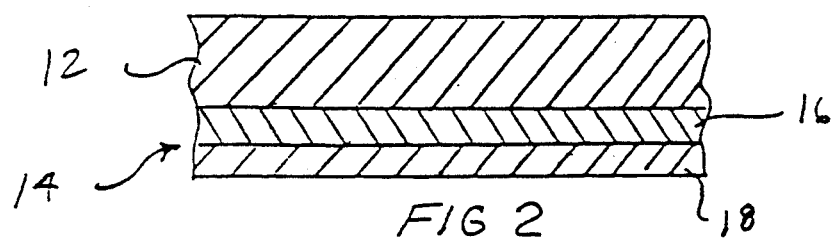
FIG. 2 is a cross sectional view of another embodiment of the coextruded film of the present invention.

An alternate embodiment of film 10 would be shown in FIG. 2 in which second inner layer 14 includes a first ply 16 adjacent first outer layer 12 and a second ply 18 which is adjacent first ply 16 and is intended for contacting foodstuffs within a package covered by film 10. First ply 16 may be composed of EVA which has a higher percentage of vinyl acetate and that contained in first outer layer 12. Second ply 18 would be composed of a material having a self-sealing capability, producing a moisture barrier, and permitting the passage of free oxygen therethrough. For example, second ply 18 may be constructed of EVA or rubberized polypropylene. In the latter case it has been found that the use of middle layer or first ply 16 of second layer 14 facilitates the adhesion of first outer 12 to the second ply 18 during the coextrusion process. Thus, the embodiment depicted in FIG. 2 can be self-welding and fat resistant.

The invention is further illustrated by the following examples:

EXAMPLE I

A two layer four inch tape was assembled by an extrusion process. The outer layer of the tape was 14 mils thick and was formed from an EVA of 4.5% vinyl acetate. The inner of the tape was 4.5 mils thick and was formed from EVA of 18% of vinyl acetate. The extrudeable temperature was measured at approximately 350° F. The four inch tape was passed through the beam of a 250° KV Energy Science Electron Curtain Accelerator. The outer layer received a dosage of 6.5 negarads. After irradiation, a flatened tape was passed through a water tank having a water temperature of 200° F. The extruded tube was oriented and collapsed into a 16 inch film having a total thickness of 1.5 mils. The orientation product was stable and the appearance of the film was excellent.

EXAMPLE II

A three layer four inch tube was produced by coextrusion through a three layer die. The outer layer of the tube was initially 16 mils thick and comprised an EVA of 3.5% vinyl acetate. The inner layer was a two ply layer having a first ply of 2 mils thick adjacent the outer layer. This first ply was composed of EVA of 9% vinyl acetate. The second ply of the inner layer was 4.5 mils thick and was a 50%-50% mixture of ethylene-propylene co-polymer with 4% ethylene mixed with polyisobutylene. The four inch tape was passed through the beam of a 300 KV Energy Science Electron Curtain Accelerator. After irradiation, the flattened tape was passed through a preheated water tank at boiling temperature. The heated tape was then passed through a hot water bath of 200° F. The tube was then oriented and collapsed into a 16 inch lay-flat tubing having a total thickness of 1.8 mils. The biaxial orientation resulted in a stable film having an excellent appearance.

While in the foregoing description, embodiments of the present invention have been set forth in considerable detail for the purposes of making a complete disclosure of the invention, it may be apparent to those of ordinary skill in the art that numerous changes may be made in such details without departing from the spirit and principles of the invention.

What is claimed is:

1. A multilayered film of 1.2 mils to 4.2 mils thick comprises the following layers:
   a. a crosslinked outer layer occupying between 60% to 98% of said multilayered film thickness, comprising a single component ethylene vinyl acetate copolymer having 3% to 15% by weight of vinyl acetate with the irradiation dosage for said crosslinking of said outer layer being greater than 4 MR,
   b. an intermediate layer occupying between 0% to 20% of said multilayered film thickness, comprising a single component ethylene vinyl acetate copolymer having 9% to 17% of vinyl acetate by weight, and sandwiched between said outer layer and the following layer,
   c. an un-irradiated inner layer occupying between 2% to 40% of said multilayered film thickness, comprising a single component ethylene vinyl acetate copolymer having 4% to 17% of vinyl acetate by weight, adapted for lying adjacent to the product, and producing a moisture barrier.

2. A multilayered film of 1.2 mils to 4.2 mils thick comprises the following layers:
   a. a crosslinked outer layer occupying between 60% to 98% of said multilayered film thickness, comprising a block copolymer or terpolymer with irradiation dosage for said crosslinking being greater than 4 MR,
   b. an intermediate layer occupying between 0% to 20% of said multilayered film thickness comprising a single component ethylene vinyl acetate copolymer having 9% to 17% of vinyl acetate by weight, and sanwiched between said outer layer and the following layer,
   c. an un-irradiated inner layer occupying between 2% to 40% said multilayered film thickness, comprising a single component ethylene vinyl acetate copolymer having 4% to 17% of vinyl acetate by weight, adapted for lying adjacent the product, and producing a moisture barrier.

3. A multilayered film of 1.2 mils to 4.2 mils thick comprises the following layers:
   a. a crosslinked outer layer occupying between 60% to 98% of said multilayered film thickness comprising a single component polyolefin polymer with the irradiation dosage for said crosslinking being greater than 4 MR,
   b. an intermediate layer occupying between 0% to 20% of said multilayered film thickness comprising a single component ethylene vinyl acetate copolymer having 9% to 17% of vinyl acetate by weight, and sanwiched between said outer layer and the following layer, c. an un-irradiated inner layer occupying between 2% to 40% of said multilayered film thickness comprising a polypropylene polymer and polypropylene ethylene copolymer mixed with an elastomer of less than 50% by weight, adapted for lying adjacent the product, and producing a moisture barrier.

4. A multilayered film of 1.2 mils to 4.2 mils thick comprises the following layers:

a. a crosslinked outer layer occupying between 60% to 98% of said multilayered film thickness comprising a material selected from the group comprising of nylon, polyester, and polystyrene with the irradiation dosage for said crosslinking being greater than 4 MR, b. an intermediate layer occupying between 0% to 20% of said multilayered film thickness comprising a single component ethylene vinyl acetate copolymer having 9% to 17% of vinyl acetate by weight, and sanwiched between said outer layer and the following layer, c. an un-irradiated inner layer occupying between 2% to 40% of said multilayered film thickness comprising a single component ethylene vinyl acetate copolymer having 9% to 17% of vinyl acetate by weight, adapted for lying adjacent the product, and producing a moisture barrier.

5. A multilayered film of 1.2 mils to 4.2 mils thick comprises the following layers:

a. a crosslinked outer layer occupying between 60% to 98% of said multilayered film thickness comprising a material selected from the group of nylon, polyester, and polystyrene with the irradiation dosage for said crosslinking being greater than 4 MR, b. an intermediate layer occupying between 0% to 20% of said multilayered film thickness comprising a single component ethylene vinyl acetate copolymer having 9% to 17% of vinyl acetate by weight, and sanwiched between said outer layer and the following layer, c. an un-irradiated inner layer occupying between 2% to 40% of said multilayered film thickness comprising a polypropylene polymer and poylpropylene ethylene copolymer mixed with an elastomer of less than 50% by weight, adapted for lying adjacent the product, and producing a moisture barrier.

6. A multilayered film of 1.2 mils to 4.2 mils thick comprises the following layers:

a. a crosslinked outer layer occupying between 60% to 98% of said multilayered film thickness comprising a block copolymer or terpolymer with the irradiation dosage for said crosslinking being greater than 4 MR, b. an intermediate layer occupying between 0% to 20% of said multilayered film thickness comprising a single component ethylene vinyl acetate copolymer having 9% to 17% vinyl acetate by weight, and sanwiched between said outer layer and the following layer, c. an un-irradiated inner layer occupying between 2% to 40% of said multilayered film thickness comprising a polypropylene polymer and polypropylene ethylene copolymer mixed with an elastomer of less than 50% by weight, adapted for lying adjacent the product, and producing a moisture barrier.

7. A multilayered film of 1.2 mils to 4.2 mils thick comprises the following layers:

a. a crosslinked outer layer occupying between 60% to 98% of said multilayered film thickness, comprising a single component ethylene vinyl acetate copolymer having 3% to 15% by weight of vinyl acetate with the irradiation dosage for said crosslinking being greater than 4 MR, b. an intermediate layer occupying between 0% to 20% of said multilayered film thickness, comprising a single component ethylene vinyl acetate copolymer having 9% to 17% by weight of vinyl acetate, and sanwiched between said outer layer and the following layer, c. an un-irradiated inner layer occupying between 2% to 40% of said multilayered film thickness, comprising a terpolymer or ionomer, adapted for lying adjacent to the product, and producing a moisture barrier.

8. A multilayered film of 1.2 mils to 4.2 mils thick comprises the following layers:

a. a crosslinked outer layer occupying between 60% to 98% of said multilayered film thickness, comprising a material selected from the group of nylon, polyester, or polypropylene with the irradiation dosage for said crosslinking being greater than 4 MR, b. an intermediate layer occupying between 0% to 20% of said multilayered film thickness, comprising a single compoc. an un-irradiated inner layer occupying between 2% to 40% of said multilayered film thickness, comprising a terpolymer or ionomer, adapted for lying adjacent to the product, and producing a moisture barrier.

9. A multilayered film of 1.2 mils to 4.2 mils thick comprises the following layers:

a. a crosslinked outer layer occupying between 60% to 98% of said multilayered film thickness, comprising a single component polyolefin with the irradiation dosage for said crosslinking being greater than 4 MR, b. an intermediate layer occupying between 0% to 20% of said multilayered film thickness, comprising a single component ethylene vinyl acetate copolymer having 9% to 17% by weight of vinyl acetate, and sanwiched between said outer layer and the following layer, c. an un-irradiated inner layer occupying between 2% to 40% of said multilayered film thickness, comprising a terpolymer or ionomer, adapted for lying adjacent to the product, and producing a moisture barrier.

10. A multilayered film of 1.2 mils to 4.2 mils thick comprises the following layers:

a. a crosslinked outer layer occupying between 60% to 98% of said multilayered film thickness, comprising a single component polyolefin with the irradiation dosage for said crosslinking being greater than 4 MR, b. an intermediate layer occupying between 0% to 20% of said multilayered film thickness, comprising a single component ethylene vinyl acetate copolymer having 9% to 17% of vinyl acetate by weight, and sanwiched between said outer layer and the following layer, c. an un-irradiated inner layer occupying between 2% to 40% of said multilayered film thickness, comprising a polypropylene polymer and polypropylene ethylene copolymer mixed with an elastomer of less than 50% by weight, adapted for lying adjacent the product, and producing a moisture barrier.

11. A multilayered film of 1.2 mils to 4.2 mils thick comprises the following layers:
   a. a crosslinked outer layer occupying between 60% to 98% of said multilayered film thickness, comprising a single component ethylene vinyl acetate copolymer having 3% to 15% of vinyl acetate by weight with said the irradiation dosage for said crosslinking being greater than 4 MR,
   b. an intermediate layer occupying between 0% to 20% of said multilayered film thickness, comprising a single component ethylene vinyl acetate copolymer having 9% to 17% of vinyl acetate by weight, and sanwiched between said outer layer and the following layer,
   c. an un-irradiated inner layer occupying between 2% to 40% of said multilayered film thickness, comprising a polypropylene polymer and polypropylene ethylene copolymer mixed with an elastomer of less than 50% by weight, adapted for lying adjacent the product, and producing a moisture barrier.

* * * * *